3,100,791
2-BORABENZOXAZOLOBORAZINES AND A
METHOD FOR THEIR PREPARATION
Bernard Rudner, Pittsburgh, and James J. Harris, Oakmont, Pa., assignors to Koppers Company, Inc., a corporation of Delaware
No Drawing. Filed Dec. 17, 1959, Ser. No. 860,072
7 Claims. (Cl. 260—462)

This invention relates to novel fused ring borazines and to the method of their preparation. In one specific aspect, it relates to novel borazines having one or more fused aroxazolo ring systems, formed by the reaction of boron halides with primary aryl amines containing, in a position ortho to the amino group, either a hydroxyl or lower alkoxy radical.

Hexa-substituted borazines containing six organo or organo and halo substituents are well known. An efficient method of making a particular class of these interesting compounds is described and claimed in the copending application of Elmer H. Dobratz, S.N. 846,771, filed October 16, 1959. The known fully substituted compounds have univalent groups such as alkyls, halogens, etc, as individual substituents attached to each of the boron and nitrogen atoms in the borazine ring. Quite surprisingly, we have discovered a new generic class of borazines which have one or more aroxazolo ring systems fused to the borazine nucleus.

It has long been known that boron trihalides can cleave ethers. It has also been established that, on deactivating the boron halide by converting it to its primary amine adduct $BX_3 \cdot RNH_2$, the ability to cleave ethers is lost under the conditions of borazine formation. Thus, C.R. Kinney and C. L. Mahoney, J. Org. Chem., 8, 526 (1943), reported that the boron trihalide adduct of paraanisidine gave only B,B',B"-trihalo N,N',N"-tris-(4-methoxyphenyl)borazine. Thus, as a result of their work, Kinney et al. found no evidence of the formation of methyl chloride or the phenolic or polymeric products that must result from the cleavage of the $-C_6H_4-O-CH_3$ groupings. It is, therefore, surprising that the class of amino ethers we employ should be cleaved, under the conditions of borazine preparation, with the resultant formation of our novel fused ring borazines. This unexpected result is further demonstrated in our Example IX, in which 2,5-dimethoxyaniline is converted to the fused ring borazines of our invention without cleavage of the second, non-ortho-alkoxy group. Our novel reaction is, of course, not limited to ethers, as we have shown in Example I.

Our novel compounds have marked utility as, inter alia, dyestuff and polymer intermediates. Direct polymer formation is demonstrated in Example XI; the infusible product is a highly heat-stable polymer. In addition, the controlled hydrolyses of our products have been found (see Example XIII) to yield the first known phenolic borazines. These have been found to couple with diazonium compounds, to yield novel polyazo dyes. In addition, they undergo the condensation reactions that make polyphenols useful in the adhesive, resin and plastic industries, e.g. formation of formaldehyde condensates, conversion to poly(epoxypropyl) ethers with epichlorohydrin, and formation of polycarbonates by reaction with phosgene. The unhydrolyzed products are also useable as dye and polymer intermediates, as shown in the examples.

It is, therefore, an object of the present invention to provide a new and useful class of cyclized or fused ring-containing borazines. It is a further object to provide a novel and economical method by which the borazines of the invention are obtained.

In accordance with the invention, we have discovered a new generic class of borazines, containing one or more benzenoid and oxygen-containing ring system fused to the borazine nucleus, of the general formula:

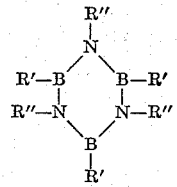

In the above formula R' as an independent substituent is a halogen atom; i.e. F, Cl, Br, I. R" as an independent substituent is R—O—Ar—$Y_n$, wherein R is hydrogen or lower alkyl, Ar is an aryl nucleus selected from the group consisting of benzene and naphthalene and Y is hydrogen, halo, nitro, carboxy, sulfo ($HSO_3$), alkyl, alkoxy, arylazo, acylamino, or cyano; $n$ (the number of substitutable positions) is an integer having a value of no greater than 4. If the value of $n$ is less than 4 and Y is other than hydrogen, the remaining substitutable positions are occupied by hydrogen atoms. The aryl nucleus of the radical R—O—Ar—$Y_n$ is directly linked to the nitrogen of the borazine nucleus and the oxygen attached to the aryl nucleus is in a position ortho to said nitrogen atom. At least one set of the substituents R'+R" is taken collectively with the boron and nitrogen atom on which they are respective substituents to form the ring system:

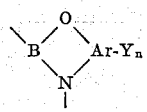

wherein Ar and $Y_n$ are defined as aforesaid.

The novel fused ring borazines are made by reacting a primary aryl amine, containing either a hydroxy or lower alkoxy substituent on the aryl nucleus in a position ortho to the amino group, with a boron halide, suitably in the presence of an inert solvent. The fused ring borazine is recovered from the reaction mixture using conventional techniques.

The most useful boron halides for purposes of the invention are boron trichloride and boron tribromide. The use of boron trifluoride or triiodide is possible, but less desirable; the former because of its decreased reactivity, the latter because of its instability. Suitable amines are those of the formula

As we have noted, the substituent R—O is ortho to the $NH_2$ group and R, Ar and $Y_n$ have the values given aforesaid. An exemplary, but not all inclusive, list of amines is given below in Table I. Table I also shows reaction products, containing one, two or three fused ring systems, obtainable by reacting the specified amine with boron trihalide, $BR'_3$, under the conditions described hereafter. The product shown is simply illustrative, since each of the parent amines can be converted to products having one, two or three fused ring systems depending, of course, on the reaction conditions used.

TABLE I
| Amine Reactant | Structure of Product |
|---|---|
| 1. 3,4,5-trichloro-2-aminophenol | 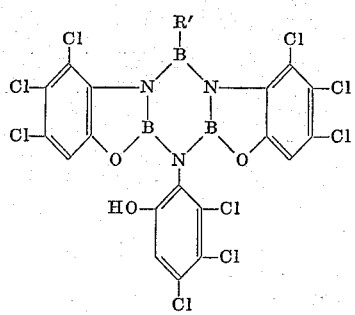 |
| 2. 3-amino-4-hydroxybenzonitrile | 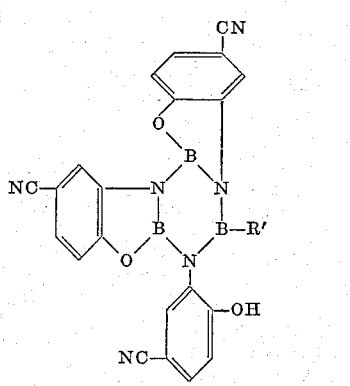 |
| 3. 4-nitro-5-bromo-2-anisidine | 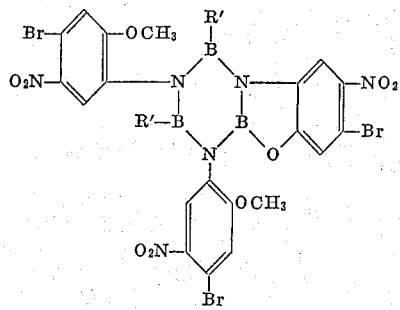 |
| 4. Ethyl 3-(-butoxy-4-aminobenzoate) | 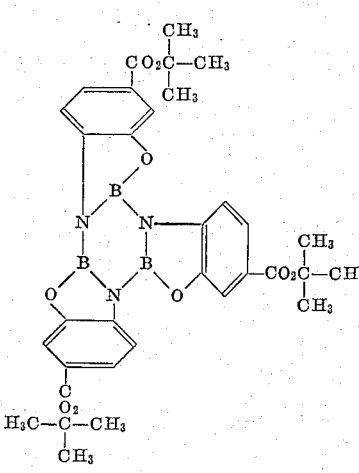 |

TABLE I—Continued

| Amine Reactant | Structure of Product |
|---|---|
| 5. 2-amino-4-acetamido-m-cresol | |
| 6. 2-amino-6-fluoro-4-(4-nitrophenylazo)phenol | |
| 7. Orthoanisidine-5-sulfonic acid | |
| 8. 2-amino-1-naphthol-4-sulfonic acid | |
| 9. 1-amino-2-naphthol-6-sulfonic acid | |

TABLE I—Continued

| Amine Reactant | Structure of Product |
| --- | --- |
| 10. 5-(4-dimethylaminophenylazo)-1-amino-2-naphthol. | |
| 11. 4-cyano-2-aminophenol | |
| 12. 3-amino-5-t-butyl-2-hydroxybenzonitrile | |

On the basis of our experimental evidence, we believe that the novel reaction proceeds by way of (1) the formation of a boron halide-amine adduct, (2) dehydrohalogenation to form the borazine ring (indicated by the evolution of hydrogen halide), and (3) ring closure to form the fused ring borazines (indicated by the formation of alkyl halide where an ether is used). Ring closure (or cyclization) of the substituted borazine is shown in Reaction Sequence A. Starting with the uncyclized products, the borazines containing one, two and three fused ring systems are derived by stepwise cyclization.

vent which is substantially inert to the reactants and products.

The mole ratio of boron halide to amine is governed

*Reaction Sequence A*

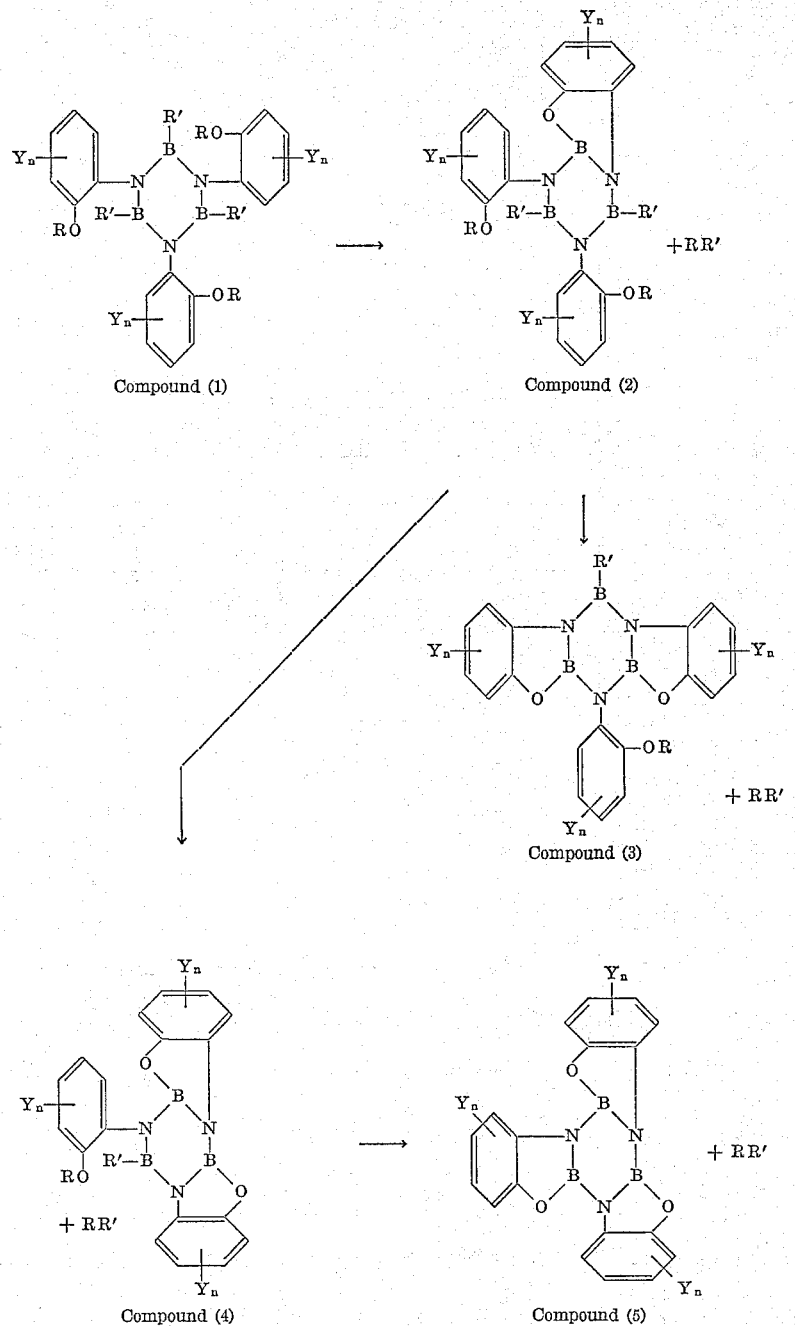

We believe that only the intermediate, Compound (3), cannot be converted to the most stable product by dehydrohalogenation or ether cleavage.

To facilitate product recovery and to promote contact between the reactants, the reaction is suitably conducted in the presence of an inert organic solvent. Useful solvents include hydrocarbons, e.g. tetralin, benzene, cyclohexane, xylene, decane, and the like; halohydrocarbons, e.g., chloroform, trichlorobenzene, and bromobenzene, and nitrogenous hydrocarbons, e.g. nitrobenzene. For purposes of the invention the particular solvent used is relatively unimportant, but it is necessary to use a solvent which is substantially inert to the reactants and products.

by practical, rather than theoretical requirements. To obtain the maximum yield of a particular fused ring borazine (i.e. to avoid the formation of complex mixtures of products), it is desirable to mix the reactants in substantially stoichiometric quantities. It is helpful, but by no means necessary, to provide a slight stoichiometric excess of boron halide to promote completion of the reaction.

The order of addition of the reactants is relatively unimportant. Since boron trichloride and boron trifluoride are normally gaseous at room temperature, the reaction may be conveniently conducted by dissolving the amine in the solvent and adding gaseous boron halide thereto in the form of small bubbles to promote intimacy of contact, thereby increasing the efficiency of the reaction. Normally, however, we prefer to condense boron trichloride and add it as a liquid.

The reaction is conducted at a temperature ranging between room temperature (ca. 25° C.) and the boiling point (reflux temperature) of the particular solvent used. Thus, any temperature up to about 210° C. is quite suitable. It is preferable to operate at reflux temperature, since this facilitates the removal of the hydrogen halide evolved during the dehydrohalogenation to form the borazine ring and the hydrogen or alkyl halide formed during ring closure. Temperatures lower than the reflux temperature of the particular solvent selected can be effectively used if a binding agent for the hydrogen halide and alkyl halide, e.g. pyridine, lutidine, trimethylamine, etc. is present in the reaction mixture.

The reaction is preferably conducted at atmospheric pressure to facilitate hydrogen halide removal. If a binding agent for the halides is present, higher or lower pressures can be used if desired. The use of atmospheric pressure is obviously more desirable from the standpoint of equipment costs.

Completion of the reaction is determinable by use of spectrophotometry. More conveniently, completion of reaction is established by cessation of gas evolution; a bubble counter connected to the top of the reflux condenser is an excellent indicator. Formation of the first fused ring is normally completed in a 2–6 hour reaction at 135° C., the second fused ring in 3–18 hours, and the third in 4–48 hours. This, of course, depends on the natures of the starting materials and the intermediates.

The product borazine is recovered using conventional techniques apparent to those skilled in the art. More often than not, the amine-boron halide adduct is insoluble, the B-trihaloborazine is soluble, the fully cyclized fused ring product (5) of Reaction Sequence A is poorly soluble, and the less completely cyclized products (2), (3) and (4) show intermediate solubilities. If, therefore, product (5) is desired, the reaction mixture can be filtered hot, and the crude (5) thus obtained as residue purified by extraction, recrystallization, or sublimation. Traces of e.g. (3) clinging stubbornly to (5) can be removed by the former's greater susceptibility to hydrolytic borazine cleavage.

Our invention is further illustrated by the following examples.

EXAMPLE I

A 2-liter, 3-necked flask was fitted with a gas inlet tube leading to a Dry-Ice-chilled cold finger condenser, a Trubore stirrer, and a reflux condenser topped by a Dry-Ice-filled cold finger condenser leading to a Dry-Ice-cooled vapor trap, then finally to an exit bubbler containing mineral oil. The flask was charged with 71 g. (0.65 mole) of o-aminophenol in 1-liter of chlorobenzene. Eighty grams (0.68 mole) boron trichloride was then condensed dropwise into the stirred mixture during a period of approximately two hours. An immediate exothermic reaction occurred, presumably the formation of a boron halide-amine adduct. After addition of boron trichloride was complete the flask contents were refluxed, causing very rapid hydrogen chloride evolution for one-half hour, with simultaneous formation of a white fluffy precipitate in the flask. During this time the adduct was largely converted to borazines. After cessation of hydrogen chloride evolution (about 4 hours refluxing), the reaction mixture was filtered at room temperature, the precipitate washed with ethyl ether and dried overnight in a vacuum desiccator to give 64 g. (0.183 mole) or 84% yield of crude tris-(2-borabenzoxazolo-[3,2-a(c,e)]-)borazine. Purification of a sample by vacuum sublimation at 275–300° C. gave a product melting at 321–324° C.

The infrared spectrum showed absorptions which could be characteristics of the desired product; very strong peaks at 6.66 and 13.46μ, and strong peaks at 8.1, 8.66, 9.81 and 14.40μ.

EXAMPLE II

In the apparatus described in Example I, 137 g. (1.11 moles) o-anisidine in 1.1-liter chlorobenzene was reacted with 134 g. (1.14 moles) boron trichloride; the mixture being kept below 50° C. during the addition step. The initial slurry was warmed slowly forming a solution, and finally refluxed for 6.7 hours, during which time a precipitate appeared. During the heating 73 g. liquid were collected in the Dry Ice vapor trap, predominantly methyl chloride (B.P. −25° C.) with some dissolved hydrogen chloride, but practically no boron chloride. After cooling, the mixture was filtered, and the filter cake washed with ethyl ether and vacuum dried. A second crop of crystals was precipitated on adding the ether wash to the mother liquor, giving a total yield of 109.5 g. (0.306 mole) or 83% yield crude tris-(2-borabenzoxazolo-[3,2-a(c,e)]-)borazine. A portion of the crude product, purified by vacuum sublimation, melted at 321–324° C., and had an infrared spectrum identical with the product prepared in Example I. Its combustion analysis values were:

| Element | Found | Theoretical for $B_3N_3O_3C_{18}H_{12}$ |
|---|---|---|
| Boron | 9.34 | 9.25 |
| Nitrogen | 12.15 | 11.98 |
| Carbon | 61.73 | 61.64 |
| Hydrogen | 3.60 | 3.48 |

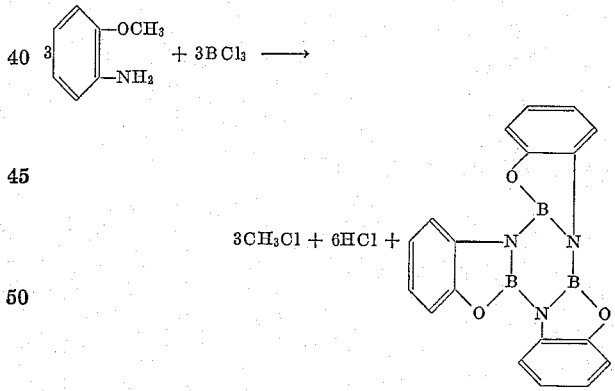

EXAMPLE III

Example II was repeated using approximately equimolar quantities of boron tribromide and anisidine, the boron tribromide being added dropwise from a pressure-equalized dropping funnel, rather than being condensed into the flask. After approximately one-half of the expected amount of hydrogen bromide had exited through the vapor trap and bubble counter, methyl bromide began to collect in the vapor trap. It was rigorously identified as methyl bromide by its mass spectrum; it was formed in about 90% of the theoretical yield. From the reaction mixture was obtained, in only about five hours of refluxing, a slightly better yield of tris-(2-borabenzoxazolo-[3,2-a(c,e)]-)borazine than was obtained in Example II.

EXAMPLE IV

In the previously described apparatus 147 g. (1.07 moles) o-phenetidine in 1-liter chlorobenzene was reacted with 129 g. (1.10 moles) boron trichloride. After boron trichloride addition was complete, the mixture was refluxed for six hours, yielding 74.5 g. of liquid ethyl chloride and hydrogen chloride in the Dry Ice trap. After cooling, the reaction mixture was filtered, the precipitate washed with ethyl ether and dried in a vacuum desiccator to give 15.3 g. (0.044 mole) 12.5% yield of tris-(2-borabenzoxazolo-[3,2-a,c,e)]-)borazine, with an infrared absorption spectrum identical to that prepared in Examples I and II, and III. Evaporation of the initial reaction filtrate at 2-10 mm. pressure and less than 110° C. gave a near-quantitative yield of the mixed products corresponding to (2), (3) and (4) in Reaction Sequence A. Specifically, we have named these products:

(2) 3,5-di-(2-anisyl)-4,6-dichloro-1 - 2 - (2 - borabenzoxazolo-[3,2-a])borazine
(3) 3-(2-anisyl)-6-chloro-1-2,4-5-bis-(2-borabenzoxazolo-[3,2-a(c)]-)borazine
(4) 5-(2-anisly)-6-chloro-1-2,3-4-bis-(2-borabenzoxazolo-[3,2-a(c)]-)borazine.

Their structures have been established with reasonable surety on the basis of hydrolysis to 2-aminophenol and 2-anisidine, and their spectra. In addition, on being held at 200-300° C. in vacuo, they were converted to ethyl chloride and additional tris-(2-borabenzoxazolo-[3,2-a(c,e)]-)borazine. The unconverted product (3), which contaminated the fully cyclized final product, was removed by its very rapid hydrolysis with dilute hydrochloric acid, leaving an additional 50% yield of the fully cyclized product.

EXAMPLE V

Repetition of Example IV using 58.7 g. of boron trichloride, 66.6 g. of orthophenetidine, and benzene, rather than chlorobenzene, with a ten hour reflux period, gave only a small yield of tris-(2-borabenzoxazolo-[3,2-a(c,e)]-)-borazine as the initial precipitate. Evaporation of the filtrate gave 65 g. of tan solid containing 3.5% chlorine, a mixture of solvates or other adducts of 3,5-di-(2-phenetyl)-4,6-dichloro-1-2 - (2-borabenzoxazolo-[3,2-a]-)borazine (Compound (2)); 5-(2-phenetyl)-6-chloro - 1-2,3-4 - bis - (2 - borabenzooxazolo - [3,2-a(c)]-)-borazine (Compound (4)); and 3-(2-phenetyl)-6-chloro-1-2,4,5 - bis - (2 - borabenzoxazolo - [3,2-a(c)]-)borazine (Compound (3)). From its melting point (indefinite, but above 100° C.) and other characteristics, the product is poorer in the higher cyclized forms (Compounds (3) and (4)) than was the solvent-soluble product of Example IV. Nevertheless, on keeping part of the mixture in refluxing chlorobenzene for 24 hours, it was almost completely converted to tris-(2-borabenzoxazolo-[3,2-a(c,e)]-)-borazine.

EXAMPLE VI

A mixture of 137.3 g. orthophenetidine and 117.2 g. boron trichloride in 1000 ml. chlorobenzene was stirred overnight, then treated with 120 g. of 2,6-lutidine. The mixture was stirred at about 60°, then cooled and filtered. The filtration residue was a mixture of lutidine hydrochloride and tris-(2-borabenzoxazolo-[3,2-a(c,e)]-)borazine, from which the amine salt could be removed by washing with chloroform. Evaporation of the filtered reaction mixture gave additional lutidine hydrochloride, plus the incompletely cyclized products (Compounds (2), (3) and (4)).

Hydroylsis of the product from all of the fully-cyclized preparations (Examples I-VI) yielded o-aminophenol. The identity of the products, as shown by identical melting points, identical infrared spectra, hydrolysis to the same product, i.e. o-aminophenol, and formation of alkyl or hydrogen chloride during the course of the reaction, establishes a novel ether cleavage in Examples II-VI to give a product identical with that of Example I.

EXAMPLE VII

A mixture of 199 g. (1.18 moles) 2-methoxy-5-nitro-aniline in 600 ml. chlorobenzene was reacted under the conditions of Example II (30 hour reflux) with 144 g. (1.23 moles) boron trichloride to give 146 g. (76%) light brown product, crude tris-(5-nitro-2-borabenzoxazolo-[3,2-a(c,e)]-)borazine, melting with decomposition at 310-320° C. after purification. Its infrared absorption spectrum and elemental analyses showed it to contain about 10% of the incompletely cyclized products.

EXAMPLE VIII

A mixture of 165 g. (1.20 moles) 2-methoxy-5-methyl-aniline in 1-liter of chlorobenzene was reacted under the conditions of Example II (12 hours' reflux) with 144 g. (1.23 moles) boron trichloride to form 48 g. (0.122 mole, 30.6% yield) of product, crude tris-(5-methyl-2-borabenzoxazolo-[3,2-a(c,e)]-)borazine, melting at 337-340° C., after purification by sublimation. The pure compound contained 64.09% carbon, 4.72% hydrogen, 8.10% boron and 10.66% nitrogen, as compared to the calculated values of 64.20% carbon, 4.62% hydrogen, 8.26% boron and 10.70% nitrogen. Its infrared absorption spectrum showed the same types of maxima as did the product of Example I.

EXAMPLE IX

A mixture of 188 g. (1.23 moles) 2,5-dimethoxyaniline in 1-liter chlorobenzene was reacted using the conditions of Example II (13 hours' reflux) with 148 g. (1.26 moles) boron trichloride to give as initial precipitate 82 g. of non-crystalline brown solid, and as residue on evaporation of the filtrate, 97.5 g. of very similar material. These two largely identical solids were mixtures of the products corresponding to Compounds (2), (3) and (4) in Reaction Sequence A, but containing no fully-cyclized (5). This was deduced from their elemental analyses, infrared absorption spectra, ebulliscopic molecular weight (about 550) and the fact that no (5) could be isolated by vacuum sublimation.

Upon being held at 300-350° at 1-10 mm. for at least eight hours, both fractions gave as sublimate a 50% (of theoretical) yield of tris-(5-methoxy-2-borabenzoxazolo-[3,2-a(c,e)]-)borazine (Compound (5)). It melted with discoloration at 272-274° C. and was found to contain 9.55% nitrogen and 7.48% boron (calculated, 9.53% nitrogen and 7.36% boron).

EXAMPLE X

A mixture of 189 g. (1.20 moles) 5-chloro-2-methoxy-aniline was reacted, using the conditions of Example II (12 hours' reflux) with 144 g. (1.23 moles) boron trichloride to give 155 g. (0.341 mole, 85% yield) of tris-(5-chloro - 2 - methoxy - 2 - borabenzoxazolo-[3,2-a(c,e)]-)-borazine, melting at 365-367° after purifiication. Elemental analyses gave the following composition: 47.25% carbon, 2.00% hydrogen, 7.53% boron, 9.12% nitrogen and 23.15% chlorine, as compared to the calculated values of 47.61% carbon, 2.00% hydrogen, 7.15% boron, 9.25% nitrogen and 23.4% chlorine.

EXAMPLE XI

Condensation, as in the previous examples, of 116 g. dianisidine and 114 g. boron trichloride in 1100 ml. of chlorobenzene, gave, during a 12 hour reflux period 67.5 g. of methyl chloride containing some dissolved hydrogen chloride in the Dry-Ice-chilled vapor tray. The reaction mixture went from an almost colorless suspension to a clear green solution and finally to a stirred slurry of green solid in a colorless solution. Filtration and washing with ether gave 161 g. (a quantitative yield) of a highly insoluble polymer, a greenish-gray powder infusible at 370° C. Although it contained both methoxy groups and chlorine atoms, a sample held at 300-350° C. at 1-5 mm. pressure for 16 hours was not completely cyclized, but contained 7.8% boron and 2.9% chlorine. On the basis of its preparative reaction, properties, elemental analyses and infrared absorption spectrum, this highly heat-stable polymer is considered to be a 3-dimensional network containing such units as

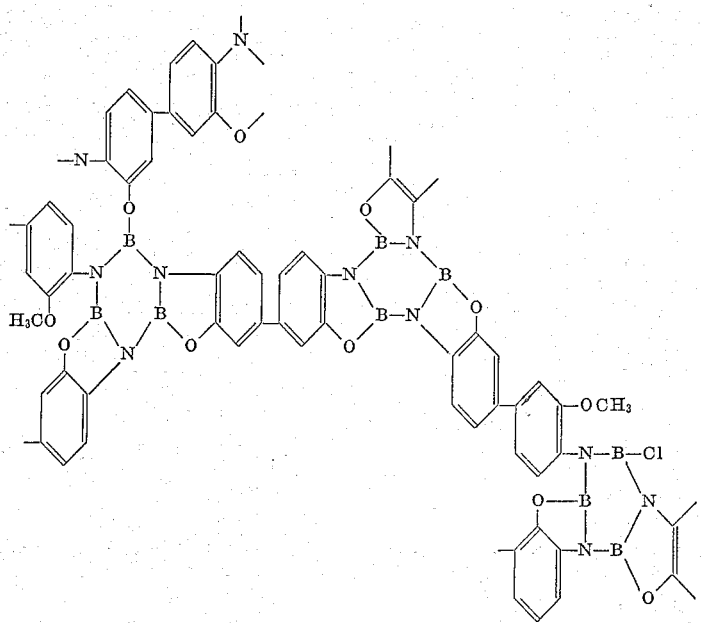

EXAMPLE XII

From the reaction of 145 g. 4-nitro-2-aminoanisole and 106 g. boron trichloride in chlorobenzene was obtained approximately 44 g. of mixed methyl chloride, boron trichloride and hydrogen chloride as condensed vapors. The first red, then green, reaction mixture, on being evaporated to dryness gave the desired products as a dark tar. The intensity of the color paralleled that of the borazine from p-nitroaniline and boron trichloride.

EXAMPLE XIII

A solution of approximately 0.03 mole tris-(2-borabenzoxazolo-[3,2-a(c,e)]-)borazine in 250 ml. of chlorobenzene was treated dropwise at 80° with an equimolar quantity of water, and the mixture stirred at that temperature overnight. Filtration gave an 85% yield of crude 2,4,6-trihydroxy-1,3,5-tris-(2-hydroxyphenyl)-borazine, as a high-melting, granular white solid; this being the first known borazinylphenol. Treatment of a solution of this product in cold, dilute alkali with a chilled solution of 4-nitrophenyldiazonium chloride gave an intense purple dye. The borazinyl-tris-phenol reacted with formaldehyde at room temperature to give an insoluble polymer.

EXAMPLE XIV

A stirred solution of 1.6 g. (0.01 mole) 1-amino-2-naphthol in 30 ml. nitrobenzene was treated dropwise with 2.5 g. boron tribromide, giving an immediate precipitate of adduct. When addition was completed and hydrogen bromide evolution well under way, the mixture was heated and stirred at reflux for four hours (by which time hydrogen bromide evolution had ceased). On cooling there were deposited 0.6 g. of tris-(2-boranaphthoxazolo-[3,2-a (c,e)]-)borazine as filtered crystals melting above 310° C. Vacuum evaporation of the filtrate gave a brown mixture of solids which, under the conditions of vacuum sublimation at 350° C., were converted to the fully-cyclized product. A ½% solution of the tris-(boranaphthoxazolo)borazine in nitrobenzene is readily sulfonated by 20% oleum at room temperature.

Even without hydrolysis, our novel products are useable as intermediates. Thus, reduction of the tris(nitro-2-borabenzoxazolo-[3,2-a(c,e)]-)borazines of Examples VII and XII leads to new triamines which can (a) be converted to new polyazo dyestuffs via their diazonium salts, and (b) be converted to polymeric polyamides by condensation with dibasic acids. A study has also been made of the potential utility of silicones derivable suitably by Grignard reaction from the bromo derivatives of the borabenzoxazoloborazines. The established heat stability of the

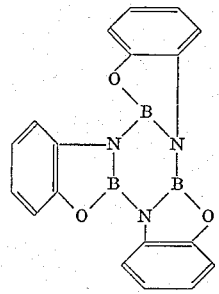

structure makes such polymers of interest.

Novel, heat-stable lubricants and hydraulic fluids can be made by, e.g., an Ullman reaction of tris-(5-bromo-2-borabenzoxazolo-[3,2-a(c,e)]-)borazine and potassium (3-phenoxyphenoxy) phenoxide in the presence of copper bronze and iodine; the viscous liquid product is presumably the tris (phenoxyphenoxyphenoxy) derivative of tris-(2-borabenzoxazolo-[3,2-a(c,e)]-)borazine. The corresponding polyalkoxy derivatives exhibit lower solidification points, but are less resistant to thermal degradation. Since the intermediate fused ring compounds, (2) and (4) of Reaction Sequence A can be converted to the fully cyclized product by heating with or without a solvent at temperatures between 130° and 350° C. until substantially all of the hydrogen halide or alkyl halide has been evolved, these intermediates are useful generally for the same purposes as the fully cyclized products. The products corresponding to (3) of the Reaction Sequence cannot be cyclized; however their mono-phenoxyphenoxy-phenoxy derivatives, formed directly as described above, show better low-temperature characteristics, and only slightly lower thermal stability than do the tris (polyethers) made as described from the fully cyclized products.

The dyestuffs made from the compounds of the invention are pigments of high tinctorial strength. They are useful in the manufacture of printing inks and paints and in the pigmentation of plastics or rubber. The polymers, as we have previously noted, are generally insoluble and possess high heat stability. They are useful in the production of shaped articles (where heat-stability is required) and cold drawn fibers.

We claim:
1. 3,5-di-(2-anisyl) - 4,6 - dichloro-1-2-(2-borabenzoxazolo-[3,2-a]-)borazine.
2. 3-(2-anisyl)6-chloro - 1-2,4-5 - bis - (2-borabenzoxazolo-[3,2-a(c)]-)borazine.
3. Method of making a borazine having from one to three aroxazolo ring systems fused to the borazine nucleus comprising reacting at a temperature between 25° C. and the boiling point of the reaction mixture a compound of the formula:

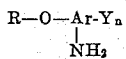

wherein R is lower alkyl, Ar is an aryl nucleus selected from the group consisting of benzene and naphthalene, Y is a substituent selected from the group consisting of hydrogen, halo, nitro, cyano, lower alkanoylamino sulfo, phenylazo, lower alkyl, and lower alkoxy, and $n$ is an integer having a value of no greater than 4, the remaining substitutable positions on the aryl nucleus being occupied by hydrogen atoms when Y is other than hydrogen and $n$ is less than 4, with a boron halide and recovering said borazine from the reaction mixture.

4. Method according to claim 3 wherein substantially stoichiometric quantities of the reactants are used and the reaction is conducted at substantially atmospheric pressure.

5. Method according to claim 3 wherein the reaction is conducted in the presence of an inert organic solvent and the reaction temperature is 25–210° C.

6. Method of making tris-(boraaroxazolo)borazines comprising heating 3,5 - bis - (2 - lower alkoxyaryl) - 4,6-dihalo-1-2-(2-boraaroxazolo-[3,2-a]-)borazine at a temperature of 130–350° C. until substantially all of the lower alkyl halide formed during the reaction has been evolved and recovering tris-(2 - boraaroxazolo - [3,2-a(c, e]-)borazine from the reaction mixture.

7. Method of making tris - (boraaroxazolo)borazines comprising heating 5-(2-lower alkoxyaryl)-6-halo-1-2,3-4-bis(2-boraaroxazolo-[3,2-a(c)]-)borazine at a temperature of 130–350° C. until substantially all of the lower alkyl halide formed during the reaction has been evolved and recovering tris-(2-boraaroxazolo-[3,2-a(c,e)]-)borazine from the reaction mixture.

References Cited in the file of this patent

UNITED STATES PATENTS 2,948,751    Brotherton _____ Aug. 9, 1960

OTHER REFERENCES

Conant and Blatt: The Chemistry of Organic Compounds (textbook), 3rd edition (1947); page 539, the Macmillan Company, New York.